United States Patent [19]
Pippert

[11] 3,915,463
[45] Oct. 28, 1975

[54] PACKING
[75] Inventor: Aaron J. Pippert, Houston, Tex.
[73] Assignee: Utex Industries, Inc., Houston, Tex.
[22] Filed: Feb. 21, 1974
[21] Appl. No.: 444,331

[52] U.S. Cl. ............................................. 277/205
[51] Int. Cl. ........................................... F16j 15/06
[58] Field of Search .......... 277/205, 206, 207, 212, 277/215, 123, 124, 125

[56] References Cited
UNITED STATES PATENTS

| 3,173,698 | 3/1965 | Haberkorn | 277/205 |
| 3,189,359 | 6/1965 | Haberkorn | 277/205 |
| 3,271,038 | 9/1966 | Bastow | 277/205 |
| 3,318,201 | 5/1967 | Blake | 277/205 |
| 3,563,558 | 2/1971 | Doutt | 277/205 |

Primary Examiner—Robert I. Smith
Attorney, Agent, or Firm—Browning & Bushman

[57] ABSTRACT

A packing member, in either strip or annular form, the member having a head with a broad planar head surface, and first and second lip sections. Each of the lip sections has a laterally outwardly facing side surface and a base. A groove extends along the entire length, or circumference, of the packing member between the bases. At least one of the lip sections has a cavity in its base extending along the length or circumference of the packing member and forming a pressure trap.

15 Claims, 7 Drawing Figures

PACKING

BACKGROUND OF THE INVENTION

1. Field of the Invention

The invention relates to packing members which may be in either annular form or in strip form and which are used to seal between two elements of an assembly which may be stationary or relatively moving. They may be used to seal between two relatively rotating elements, such as a rotating shaft and stuffing box or a stationary shaft and rotor, or between two relatively reciprocating elements such as a piston and cylinder. In any case they provide a pressure seal against the flow of a fluid between the two members. The individual packing members may be used singly in some applications and may be stacked in other applications.

2. Description of the Prior Art

One type of packing previously used in the above discussed applications is generally V-shaped in cross-sectional configuration. It has a head or top which corresponds to the apex of the V and two lips extending radially and axially away from the head to form the legs of the V. The pressure of the fluid being sealed against forces the lips apart so that one lip seals against one of the elements of the assembly and the other lip seals against the other element. One of the disadvantages of this type of packing is that adapter rings are needed at the top and bottom of a packing member, or at the top of an uppermost and the bottom of a lowermost packing member in a stack, to keep the packing members properly positioned. Not only do these adapter rings make the sealing system more complicated and expensive, but due to the additional space they consume, it is often impossible to use the system because there is not enough space for a packing member plus the adapter rings or because there is not enough room for the adapter rings plus the number of packing members needed in a stack to provide a sufficient seal for the particular application.

One improvement over this type of packing is known as a "modified V" type packing. This type still has a head and a pair of lips extending therefrom. However, the bottom of the packing includes a pedestal extending away from the head in the general direction of the lips and centrally located therebetween. The pedestal provides support so that the bottom adapter ring may be eliminated. However, the top adapter ring is still needed. Moreover, the lips are adjoined to the pedestal by relatively thin portions which reduce the wear zone. The packing tends to fracture at these thin portions particularly if it is formed of a fabric impregnated with an elastomeric, thermosetting, or thermoplastic material.

SUMMARY OF THE INVENTION

In accord with the present invention a strip or annular packing member is provided which eliminates the need for both top and bottom adapter rings and maximizes the wear zone of the packing.

The packing member of the invention includes a head having a relatively broad planar head surface and first and second lip sections. Each lip section has a laterally outwardly facing side surface and a base. A groove between the bases extends along the length, or circumference, of the packing member opening downwardly away from the head. At least one of the lip sections has a cavity extending along the length or circumference of the packing member between its side surface and the groove and also opening downwardly. The cavity forms a pressure trap and preferably its laterally outermost surface extends laterally outwardly from top to bottom. Two such cavities may be provided, one in each lip section. These cavities are preferably not as deep as the groove.

The relatively broad planar head surface of the head of the packing member eliminates the need for a top adapter ring. Furthermore, the provision of two bases, spaced apart by the groove, provides a relatively broad support region at the bottom which eliminates the need for a bottom adapter ring. Sealing ability, however, is not sacrificed. Pressure entering the cavity aids in achieving low pressure sealing by urging the lower portion of the side surface laterally outwardly. Thus, the side surfaces are forced into sealing engagement with the faces of the members being sealed by the pressure sealed against.

A wear zone or heel is provided on the side of each lip section adjacent the broad head surface of the head. The lip sections flex laterally inwardly relatively easily upon insertion of the packing member into the assembly to provide an initial seal without application of pressure. When high pressure is applied, it fills the groove bringing the wear zones into tight contact with the adjacent faces of the assembly. Thus, high pressure wear will occur primarily at the wear zones. These wear zones are maximized by the thickness of the lip sections. Thus, considerably wear can occur without danger of the lip sections breaking or a seal being lost.

It is, therefore, an object of the present invention to provide a packing member which eliminates the need for adapter rings.

Another object of the invention is to provide a packing member which is configured to maximize the wear zones of the packing.

Still another object of the invention is to provide a packing member having a relatively broad head surface and a broad base support region.

Other objects, features and advantages of the invention will be made apparent by the drawings and the detailed description and claims which follow.

BRING DESCRIPTION OF THE DRAWINGS

DESCRIPTION OF THE PREFERRED EMBODIMENTS

Figure 1:
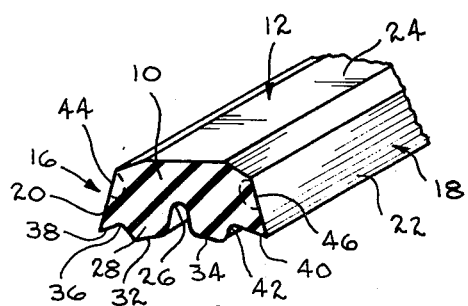
FIG. 1 is a fragmentary perspective view of a section of strip packing according to the present invention.
Figure 2:
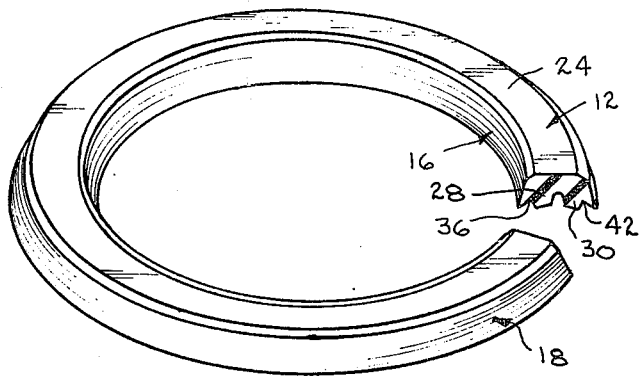
FIG. 2 is a perspective view of an annular packing member according to the invention with a section broken away.
Figure 3:
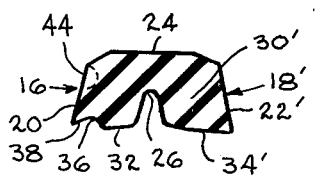
FIG. 3 is a transverse cross-sectional view of a single lip form of the packing of the invention.

Referring now to the drawings, FIGS. 1–3 depict various embodiments of the packing of the present invention. FIG. 1 shows a fragment of an elongate strip packing, the end 10 showing the cross-sectional configuration. The packing member can be considered to have a head 12. In practice, the packing member can be disposed in any position so that there is no true upper part. However, that portion which lies uppermost in FIGS. 1–3, and which in use ordinarily faces away from the positive pressure being sealed against, is defined as the head or top. The opposite portion is defined as the bottom, and the terms upwardly and downwardly are used herein in this sense. The packing member can also be considered to be divided into two opposed and adjoining lip sections 16 and 18. The lip sections 16 and 18 have respective side surfaces 20 and 22 which flare slightly laterally outwardly from top to bottom, and respective bases 28 and 30.

Head 12 has a planar head surface 24 which is quite broad relative to the total breadth of the packing member. As best seen in FIG. 3, the surface 24 is more than half as broad as the packing member. A groove 26 between the bases 28 and 30 extends along the entire length of the packing member and opens downwardly. A plane tangent to the apex of the groove 26 generally marks the boundary between the head 12 and bases 28 and 30, while a plane bisecting the groove 26 generally marks the boundary between the two lip sections 16 and 18.

Lip section 16 has a first cavity 36 in its base 28 between its side surface 20 and the groove 26. The cavity 36 opens downwardly and extends along the entire length of the packing member. According to the present invention, at least one of the lip sections of the packing member has such a cavity. In many and, indeed, most instances it will be desirable for both lip sections to have such a cavity to provide optimum sealing on both sides. Accordingly, in the embodiment of FIG. 1, the other lip section 18 has a second cavity 42 similar to cavity 36 in its base 30 between its side surface 22 and the groove 26. Cavity 42 also opens downwardly and extends along the entire length of the packing member. The cavities 36 and 42 are preferably shallower than groove 26. FIG. 3 shows another embodiment in which lip section 16 alone has a cavity 36, while lip section 18' does not have a cavity.

Preferably, the cavities 36 and 42 have respective laterally outermost surfaces 38 and 40 which extend laterally outwardly from top to bottom. In a preferred form of the invention, surface 38 converges with side surface 20 to form a leading edge on the side of lip section 16, and surface 40 similarly converges with side surface 22 to form a leading edge on the side of the other lip section 18.

The lip sections 16 and 18 have, on their bases 28 and 30, respective base surfaces 32 and 34 which extend slightly downwardly as well as laterally outwardly from the groove 26. The base surfaces 32 and 34 extend from the groove 26 to the respective cavities 36 and 42. In the modified lip section 18' of FIG. 3, there is no cavity so that the base 30' has a base surface 34' which tapers slightly downwardly and laterally outwardly from the groove 26 all the way to the side surface 22'. It will be noted that the base surfaces 32 and 34 or 32 and 34' provide a relatively broad support region at the bottom of the packing member.

The lip sections 16, 18 and 18' have respective wear zones or heels 44, 46 and 46' located on respective side surfaces 20, 22 and 22' in the head of the packing member adjacent the head surface 24.

Under high pressures, most of the wear will occur at the wear zones 44 and 46 (or 46'). In prior art packing members of the "modified V" or pedestal type, the provision of a central pedestal made it necessary to reduce the thickness of the lips. Of necessity, the lips of these prior art packings were joined to the central pedestals by relatively thin portions adjacent the wear zones. Thus, a relatively small amount of wear at the wear zones would cause the packing to become weakened at these thin portions and the lips to break off. In the present invention, the bases provide the advantages of the pedestals of the prior art packings. Yet, the lip sections are relatively thick. Thus, a large amount of wear can occur in the wear zones 44 and 46 without danger of the lip sections breaking. It can be seen by reference to the drawings that the wear zone 44, for example, would have to wear almost to center of the packing before it would approach the groove 26 and cause the lower part of lip section 16 to break away.

Thus, the breadth of the head 12 of the packing, together with the thickness of the lip sections maximizes the wear zones. It will be appreciated that these thick lip sections are at least partly made possible by the cavities therein. These cavities, which serve as pressure traps in a manner to be described below, make it possible to form a tight seal at the bottom of the side surfaces under low pressures, in spite of the relative rigidity of the thick lip sections.

It will be appreciated that in the embodiment of FIG. 1, the lip section 18, including base 30 and cavity 42 is a mirror image of lip section 16 with its base 28 and cavity 36 so that the packing member is symmetrical about a plane which bisects the groove 26. However, it will also be appreciated that asymmetrical forms could be designed within the scope of the invention.

The strip form of packing shown in FIG. 1 can be either molded or extruded into long strips which may be cut into shorter lengths to form individual packing members. An individual strip packing member which has been cut to the desired length is formed into an annulus and the abutting ends adjoined. The ends may be cut to form a joint, and the joint may be permanently fused by vulcanizing, adhesive, or any other suitable method as is well known in the art. This form of the invention is intended primarily for field or emergency uses or other applications in which it is not practical to provide annular packing members, e.g., when only a few packing members of a given ID or OD are needed. If an embodiment such as is shown in FIG. 3 is used, it may be disposed with the lip section 16, having the cavity 36 on either the ID or the OD as needed.

The breadth of the packing member is chosen with respect to the assembly in which it is to be used so that when the packing is in place between the elements of the assembly, each lip section will be flexed inwardly by the adjacent element of the assembly to form an initial interference seal against said element when there is no pressure being applied. The packing is ordinarily used to seal against a fluid having a positive pressure and is disposed in the assembly so that the bases face this fluid. As the pressure begins to build, the pressurized fluid will fill the cavities 36 and 42, which form pressure traps, and push the lower portions of the side surfaces 20 and 22 into sealing engagement with the faces of the assembly. Thus, a low pressure seal is quickly formed. This action is enhanced by the fact that surfaces 38 and 40 are directed laterally outwardly from top to bottom as this configuration allows a fairly tight seal to be effected at relatively low pressure.

As the pressure increases, the pressure of fluid enters groove 26. This will tend to urge lip sections 16 and 18 outwardly and bring the wear zones 44 and 46 into tight sealing engagement with the faces of the assembly. In this manner, a high pressure seal is formed. Under high pressure, the seal is tightest at the wear zones, the lower portions of the lip sections being freer to flex inwardly, so that most of the wear occurs at these zones.

The relative breadth of the head, head surface, and support region of the bases keeps the packing properly in place and eliminates the need for adapter rings by providing support against undue distortion of the packing under pressure, mechanical loading, etc. The fact that the base surfaces 32 and 34 are directed slightly downwardly from the groove 26 allows the bases 28 and 30 to easily expand away from each other upon application of pressure to compensate for slight variations in the diameters of the elements of the assembly, wear of the packing member, etc.

It will be understood that the sealing action of a packing member as shown in FIG. 3 will be similar except that there will be less low pressure sealing on the side surface of the lip section 18' which has no cavity.

In addition to the strip form of packing member shown in FIG. 1, packing members according to the present invention may be formed in annular configuration. Such an annular member is usually formed by molding. The annular packing member may be a split ring, or it may be a continuous ring molded as such or formed by permanently joining the ends of a split ring by vulcanizing, adhesive or any other suitable method. The term "annular" will be construed herein to include split rings whether or not the ends have been permanently joined.

The ring R of FIG. 2 has the same cross-sectional configuration as the strip packing member of FIG. 1. Briefly, the ring R comprises a head 12 having a broad planar head surface 24, lip sections 16 and 18 having respective bases 28 and 30 and cavities 36 and 42, and groove 26 all extending around the entire circumference of the ring. The ring shown in FIG. 2 has a cavity on the radially inner as well as the radially outer lip section. However, it should be understood that, if desired, the ring could be formed with a cavity in only one lip section. The ring might then have a cross-sectional configuration as shown in FIG. 3 in which the lip section 18' could be disposed on either the ID or the OD depending on the sealing requirements. The action of the various parts of the ring such as the cavities, wear zones, etc., is identical to that of the same parts in the strip type packing of FIG. 1 when the packing ring is in place in an assembly to be sealed.

The packings of the present invention can be formed from numerous different materials. The packings can be made from thermoplastic materials, thermosetting materials, fabric reinforced thermosetting materials, fabric reinforced thermoplastic materials, mixed thermoplastic thermosetting materials or any combinations of the above. In effect, the packing can be homogeneous or heterogeneous in that it can be made of a single material or a homogeneous blend of multiple materials, or it can be made of a plurality of different materials. It should also be recognized that the packing can be constructed such that various portions, such as, for example, the heel portions mentioned above, can contain reinforcing material for added strength. In the latter respect, the packing herein can be constructed in accordance with the teaching contained in U.S. Pat. No. 3,719,366. The term thermosetting, as used herein, applies to those resins, generally synthetic in nature, which solidify or set on heating and cannot be remelted. Non-limiting examples of such thermosetting resins include phenolics, alkyds, amino resins, polyesters, epoxies, silicones and the like. The term thermoplastic, as used herein, applies to those resins, generally synthetic in nature, that may be softened by heat and then regain their original properties upon cooling. Non-limiting examples of such thermoplastic materials include nylon, polyethylene, polypropylene, cellulose and acrylic resins, polycarbonates and the like. In addition to the above materials, the packings can be constructed of resilient materials such as natural or synthetic rubber or some other such natural or synthetic elastomeric material. The packings can be made of such elastomeric materials alone or in combination with fabrics, various thermoplastic or thermosetting resins, or mixtures of any of the foregoing. Typical such elastomerics include polychloroprene, sytrene-butadiene rubbers, styreneacrylonitrile-butadiene terpolymers, fluoroelastomers such as copolymers or vinylidine chloride and hexafluoropropylene, polyurethane and other such synthetic polymeric materials which are generally resilient and elastomeric in nature.

As noted, the packings can comprise a thermosetting or a thermoplastic material reinforced with a fibrous material which can be in the form of a cloth or as a chopped or flocked filler. The terms fabric or fibrous materials, as used herein, refer to any material obtained by weaving or any other such techniques wherein the matrix consists of a lattice work or web of thread or like elements. Numerous materials fall into this class such as, for example, cotton, asbestos, fiber glass, nylon, polyesters, linen, rayon and the like. Furthermore, blends of various materials such as cotton-polyester fabrics, rayon-polyester fabrics, etc., may also be employed.

It will be apparent from the foregoing, that the materials of construction of the packing herein is virtually unlimited and will depend upon the environment in which the packing is used. Accordingly, the foregoing description pertaining to the types of materials employed and the manner of constructing the packing is intended to be merely exemplary and not exhaustive.

As noted above, either the entire packing member or suitable portions thereof can be reinforced with a fibrous material or fabric. This construction gives added strength and durability to the reinforced part thereby alleviating wear and increasing the life of the packing member. Even though the fabric reinforcement also renders the packing member more brittle, it has been found that, due to the unique cross-sectional configuration of the packing member, the relatively thick lips do not fracture. It should also be noted that the portion of the packing member from the apex of the groove 26 upwardly to the head surface 24 is sufficiently thick to prevent the packing breaking in this area.

Figure 4:
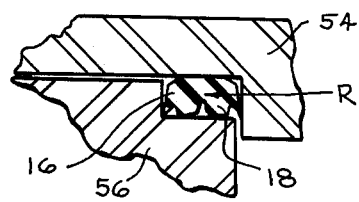
FIG. 4 is a fragmentary cross-sectional view of a packing member of the invention in sealing position between two relatively stationary members.
Figure 5:
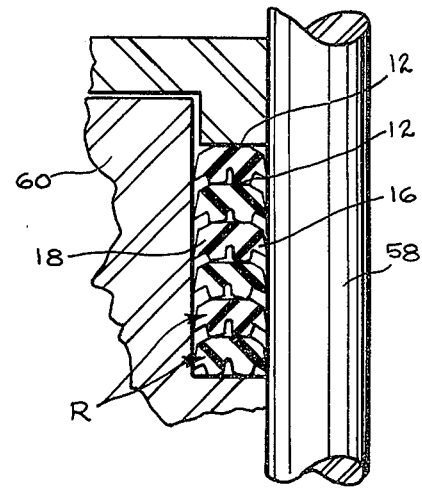
FIG. 5 is a fragmentary cross-sectional view of a plurality of packing members of the invention stacked in sealing position between a rotating shaft and a stuffing box.
Figure 6:
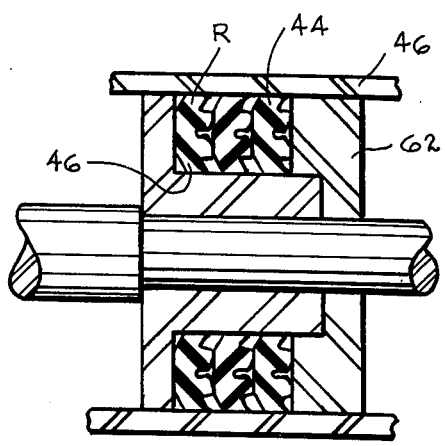
FIG. 6 is a fragmentary cross-sectional view of a plurality of packing members of the invention stacked in sealing position between a piston and cylinder.
Figure 7:
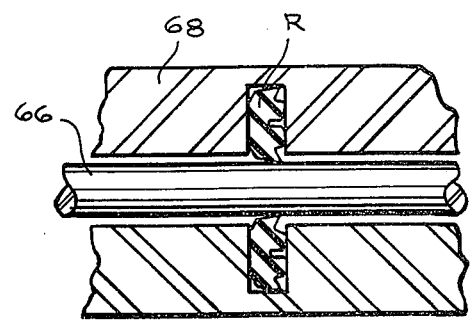
FIG. 7 is a fragmentary cross-sectional view of a packing member of the invention in sealing position between a shaft and a housing.

FIGS. 4–7 show several ways in which rings of the packing, either pre-formed as in FIG. 2 or formed from strip packing as in FIG. 1, can be used. In FIGS. 4, 5 and 7, the rings are shown in a relaxed state, i.e., without the application of high pressure. In FIG. 4 a single ring R is used to seal between two relatively stationary elements 54 and 56 of an assembly. It will be noted that the lower portions of the side surfaces 20 and 22 of the lip sections 16 and 18 are in contact with the respective adjacent elements of the assembly. The same is true of each of the rings R in FIGS. 5 and 7.

FIG. 5 shows an application in which a stack of rings R is used. Generally, as seen in FIG. 5, the rings will always be stacked with their heads 12 facing in the same direction. However, in certain applications, some of the rings may be reversed, i.e., with their heads 12 facing in opposite directions. In the assembly shown, the rings are used to seal between a rotating shaft 58 and a stuffing box 60. The lip sections 16 and 18 of the rings, respectively, seal against the shaft 58 and the stuffing box 60.

In FIG. 6 a stack of rings R is used to seal between two longitudinally reciprocating elements, namely a piston 62 and a cylinder 64, the rings being under high pressure. It will be noted that the lip sections 16 and 18 are flexed inwardly and the wear portions are in contact with the respective adjacent elements of the assembly, e.g., wear portion 44 is in contact with cylinder 64. In FIG. 7 a single ring R is used to seal between a shaft 66 and a housing 68 which may be relatively rotating or reciprocating, the ring R being disposed in a groove in the housing 68. In each case, one lip section of each ring is disposed adjacent one element of the assembly and the other lip section of the ring is disposed adjacent the other element of the assembly. It will also be noted that in each of the applications depicted in FIGS. 4–7, the packing members are used without adapter rings of any kind whether a single packing ring or a stack of rings is employed.

It will be appreciated that the packing of the invention can be used in many different environments. Many modifications of the packing can be made without departing from the invention, the scope of the invention being limited only by the claims.

I claim:

1. An annular packing member comprising:
   first and second lip sections adjoined to form a relatively broad planar head surface, each of said lip sections having a laterally outwardly facing side surface and a base; said packing member having a groove between said bases, said groove extending the circumference of said packing member and opening downwardly away from said head; said first lip section having a cavity in its base between its side surface and said groove, said cavity extending the circumference of said packing member, opening downwardly away from said head, and forming a pressure trap.

2. A packing member according to claim 1 wherein said cavity is partially defined by a laterally outermost surface which extends laterally outwardly from top to bottom.

3. A packing member according to claim 2 wherein the side surface of said one lip section and said laterally outermost surface of said cavity converge to form a leading edge.

4. A packing member according to claim 1 wherein said first lip section is the radially inner lip section.

5. A packing member according to claim 1 wherein said first lip section is the radially outer lip section.

6. A packing member according to claim 1 wherein said cavity is shallower than said groove.

7. A packing member according to claim 1 wherein said bases have base surfaces extending downwardly and laterally outwardly from said groove.

8. A packing member according to claim 1 wherein said second lip section has a second cavity in its base between its side surface and said groove, said second cavity extending the circumference of said packing member, opening downwardly away from said head, and forming a pressure trap.

9. An elongate strip packing member comprising:
   first and second lip sections adjoined to form a relatively broad planar head surface, each of said lip sections having a laterally outwardly facing side surface and a base; said packing member having a groove between said bases, said groove extending the length of said packing member and opening away from said head; said first lip section having a cavity in its base between its side surface and said groove, said cavity extending the length of said packing member, opening away from said head, and forming a pressure trap.

10. A packing member according to claim 9 wherein said cavity is partially defined by a laterally outermost surface which extends laterally outwardly from top to bottom.

11. A packing member according to claim 10 wherein the side surface of said one lip section and said laterally outermost surface of said cavity converge to form a leading edge.

12. A packing member according to claim 9 wherein said cavity is shallower than said groove.

13. A packing member according to claim 9 wherein said bases have base surfaces extending downwardly and laterally outwardly from said groove.

14. A packing member according to claim 9 wherein said second lip section has a second cavity in its base between its side surface and said groove, said second cavity extending the length of said packing member, opening downwardly away from said head, and forming a pressure trap.

15. A packing member according to claim 14 further being symmetrical about a plane bisecting said groove.

* * * * *